(12) United States Patent
Schaefer et al.

(10) Patent No.: US 9,383,243 B1
(45) Date of Patent: Jul. 5, 2016

(54) MATERIAL LEVEL SENSOR

(71) Applicants: Steven J. Schaefer, Lincoln, NE (US); J. Klint Bremer, Seward, NE (US)

(72) Inventors: Steven J. Schaefer, Lincoln, NE (US); J. Klint Bremer, Seward, NE (US)

(73) Assignee: GARNER INDUSTRIES, INC., Lincoln, NE (US)

( * ) Notice: Subject to any disclaimer, the term of this patent is extended or adjusted under 35 U.S.C. 154(b) by 213 days.

(21) Appl. No.: 14/451,797

(22) Filed: Aug. 5, 2014

(51) Int. Cl.
*G01F 23/00* (2006.01)
*H01H 35/02* (2006.01)

(52) U.S. Cl.
CPC .......... *G01F 23/003* (2013.01); *G01F 23/0007* (2013.01); *H01H 35/02* (2013.01); *H01H 35/027* (2013.01); *H01H 2231/038* (2013.01)

(58) Field of Classification Search
CPC ... G01F 23/003; G01F 23/0007; H01H 35/19; H01H 25/02; H01H 2231/038
USPC ..................................................... 200/61.21
See application file for complete search history.

(56) References Cited

U.S. PATENT DOCUMENTS

| | | | | |
|---|---|---|---|---|
| 2,851,553 | A * | 9/1958 | Grostick | G01F 23/226 200/61.21 |
| 3,290,462 | A * | 12/1966 | Watkins | G01F 23/003 200/61.21 |
| 4,211,966 | A * | 7/1980 | Sweet | H01H 35/18 200/61.21 |
| 4,318,624 | A * | 3/1982 | Jett | G01F 23/003 340/615 |

* cited by examiner

*Primary Examiner* — Daniel J Colilla
(74) *Attorney, Agent, or Firm* — Dennis L. Thomte; Thomte Patent Law Office LLC (57) ABSTRACT

A flowable material level sensor for use in a material containment structure which closes or activates a switch when the flowable material in the containment structure reaches a predetermined level. The sensor includes an elongated rod or wand which extends downwardly from a sensor housing positioned in the containment structure. The sensor includes an actuator assembly which converts angular or lateral movement of the rod into upward longitudinal movement of an actuator element therein which closes the switch when the level of material in the containment structure has reached the predetermined level. The closure of the switch is communicated to a monitoring station remote from the containment structure.

12 Claims, 10 Drawing Sheets

MATERIAL LEVEL SENSOR

BACKGROUND OF THE INVENTION

1. Field of the Invention

This invention relates to a material level sensor and more particularly to a material level sensor of the tilt type for sensing the level of flowable materials such as cement, grain or coal in a containment structure such as an elevator, bin, granary, silo, etc.

2. Description of the Related Art

Many types of material level sensors or monitors have been previously provided which sense the level of flowable or particulate material such as grain, cement, coal, etc. in a containment structure. Many of the prior art systems employ an electric switch which is closed upon the level of material in the containment structure reaching a predetermined level. One of the problems of the prior art systems is that the actuation of the sensor switch may create a spark which may cause an explosion of the dust from the grain, cement, coal, etc. Further, a problem with the prior art level sensors is that they are unduly complicated and expensive to manufacture and install. A further disadvantage of some of the prior art level sensors is that they employ a switch having hazardous mercury therein.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A material level sensor is disclosed for sensing the level of a flowable material such as cement, grain or coal, etc. in a containment structure such as an elevator, bin, granary, silo, etc. The flowable material level sensor includes a vertically disposed cylindrical and cup-like shaped lower housing having an open upper end, a closed lower end, an inner surface, an outer surface and an internal compartment. The lower housing has external threads formed in the outer surface thereof at the open upper end thereof. An inverted cup-shaped cover is selectively threadably secured to the external threads at the upper end of the lower housing. The lower housing has at least one hollow, first tubular member or stub extending horizontally laterally outwardly from the internal compartment thereof which is configured to have a cable or wires extending therethrough. The lower end of the lower housing has a centrally located circular opening formed therein. The lower housing has a hollow second tubular member having upper and lower ends which extends downwardly from the lower end of the lower housing with the interior of the second tubular member being in communication with the circular opening in the lower end of the lower housing. A cylindrical bushing, having upper and lower ends, is positioned in the circular opening in the lower end of the lower housing. The second tubular member may have external threads formed therein at the lower end thereof. The second tubular member also has internal threads formed therein at the lower end thereof.

The level sensor also includes a vertically disposed cylindrical actuator assembly having upper and lower ends. The actuator assembly includes a vertically disposed and cylindrical upper housing member having upper and lower ends. The upper housing member of the actuator assembly has a generally cylindrical lower bore extending upwardly thereinto from the lower end thereof. The upper housing member of the actuator assembly also has a cylindrical upper bore extending downwardly thereinto which communicates with the cylindrical lower bore thereof. The cylindrical upper bore has a diameter less than the cylindrical lower bore so that a shoulder is formed at the juncture of the cylindrical upper and lower bores of the upper housing member of the actuator assembly. The upper housing member of the actuator assembly has external threads at the lower end thereof so that the upper housing member may be threadably secured to the internal threads of the second tubular member.

The actuator assembly also includes a vertically disposed cylindrical lower housing member having upper and lower ends. The upper end of the lower housing member of the actuator assembly is selectively secured to the lower end of the upper housing member of the actuator assembly. The lower housing member of the actuator assembly has a semi-spherical upper bore extending downwardly thereinto. The upper end of the upper bore of the lower housing member of the actuator assembly has the same diameter as the lower end of the lower bore of the upper housing member of the actuator assembly and is in communication therewith. The upper bore of the lower housing member of the actuator assembly is semi-spherically configured to provide a ball member receiving socket. The lower housing member of the actuator assembly has a tapered lower bore extending upwardly thereinto which communicates with the upper bore of the lower housing.

The actuator assembly also includes a lower actuator element with the lower actuator element including an elongated and cylindrical shaft having upper and lower ends and a generally semi-spherical ball member secured to the upper end of the cylindrical shaft thereof with the ball member having an upper end which has a semi-spherical socket formed therein.

The semi-spherical ball member of the lower actuator element is movably positioned in the arcuate ball member receiving socket in the upper bore of the lower housing member of the actuator assembly with the cylindrical shaft of the lower actuator element extending downwardly through the lower bore of the lower housing member so that the lower end of the shaft of the lower actuator element is disposed below the lower end of the actuator assembly.

The actuator assembly also includes an upper actuator element. The upper actuator element includes an elongated and cylindrical shaft having upper and lower ends and a generally semi-spherical ball member secured to the lower end of the shaft thereof with the shaft thereof extending upwardly through the lower and upper bores of the upper housing member of the actuator assembly and with the ball member thereof being movably received by the semi-spherical socket in the upper end of the ball member of the lower actuator element. The upper actuator element is vertically movable from a lower position to an upper position. A spring is associated with the upper actuator element to yieldably urge the upper actuator element downwardly so that the ball member on the upper actuator element is urged into engagement with the semi-spherical socket formed in the upper end of the semi-spherical ball member on the upper end of the cylindrical shaft of the lower actuator element.

A vertically disposed rod has its upper end secured to the lower end of the lower actuator element and extends downwardly therefrom. When the level of material in the containment structure reaches the lower end of the rod and moves the same laterally, the lower actuator element is pivotally or angularly moved which causes the upper actuator element to move upwardly.

A normally open actuator switch is mounted in the lower housing directly above the upper end of the shaft of the upper actuator element. When the shaft of the upper actuator element is moved upwardly upon the rod being moved laterally by the material, the shaft of the upper actuator element closes the actuator switch. The closure of the actuator switch either alerts an operator of the material level and/or deactivates the conveyor supplying material to the containment structure.

A principal object of the invention is to provide an improved material level sensor of the tilt type.

A further object of the invention is to provide a novel tilt switch which converts angular movement to linear movement thereby closing a switch to shut down a conveyor or to alert an operator of the closure of the switch.

A further object of the invention is to provide a device of the type described which does not use mercury in the switch thereof.

A further object of the invention is to provide a device of the type described which is simple and unique in design.

A further object of the invention is to provide a device of the type described which easily meets hazardous location certification requirements.

A further object of the invention is to provide a device of the type described which is inexpensive to produce and easily mounted in a containment structure.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
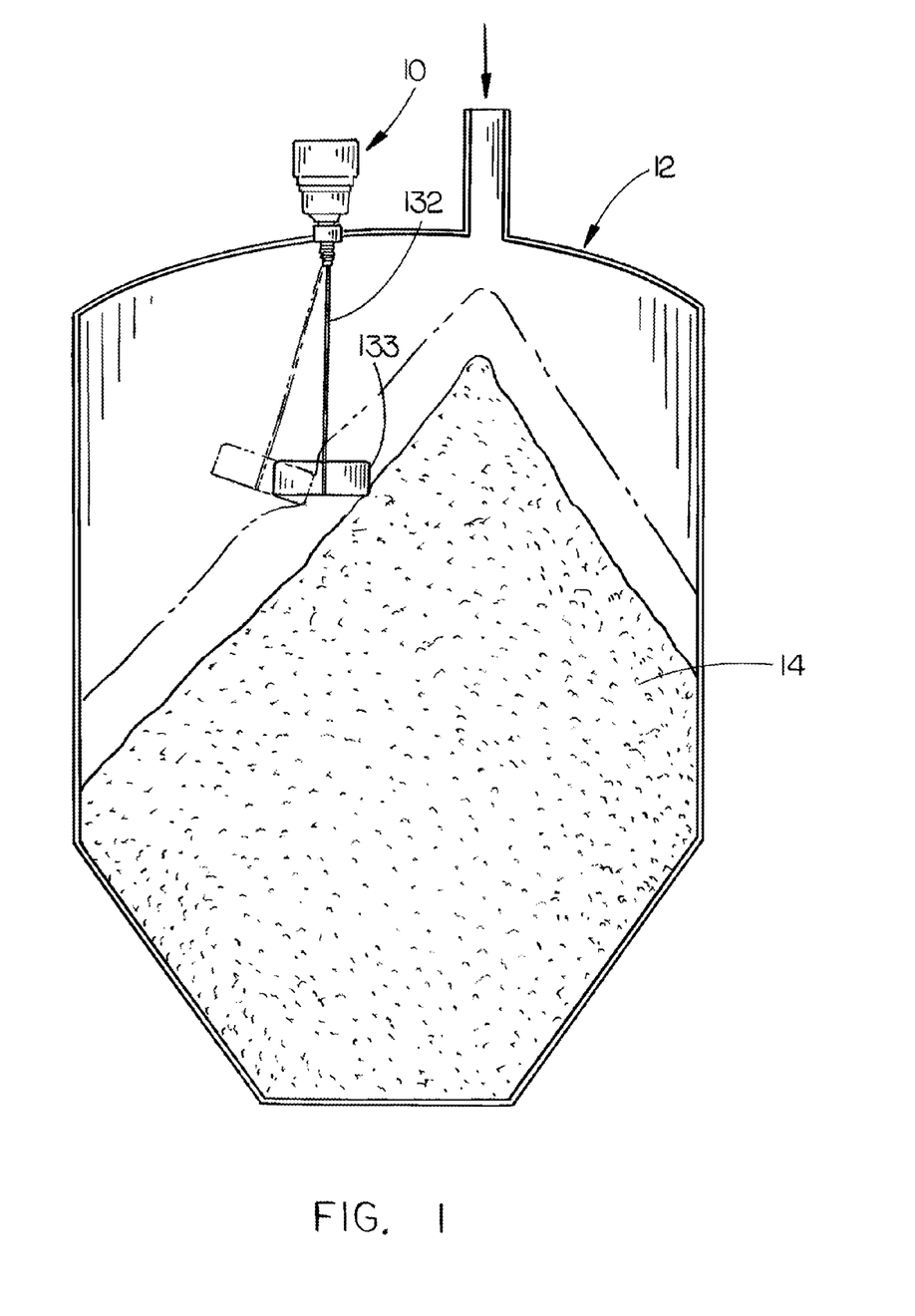
FIG. 1 is a cross-sectional view of a material containment structure having the level sensor of this invention installed therein.
Figure 2:
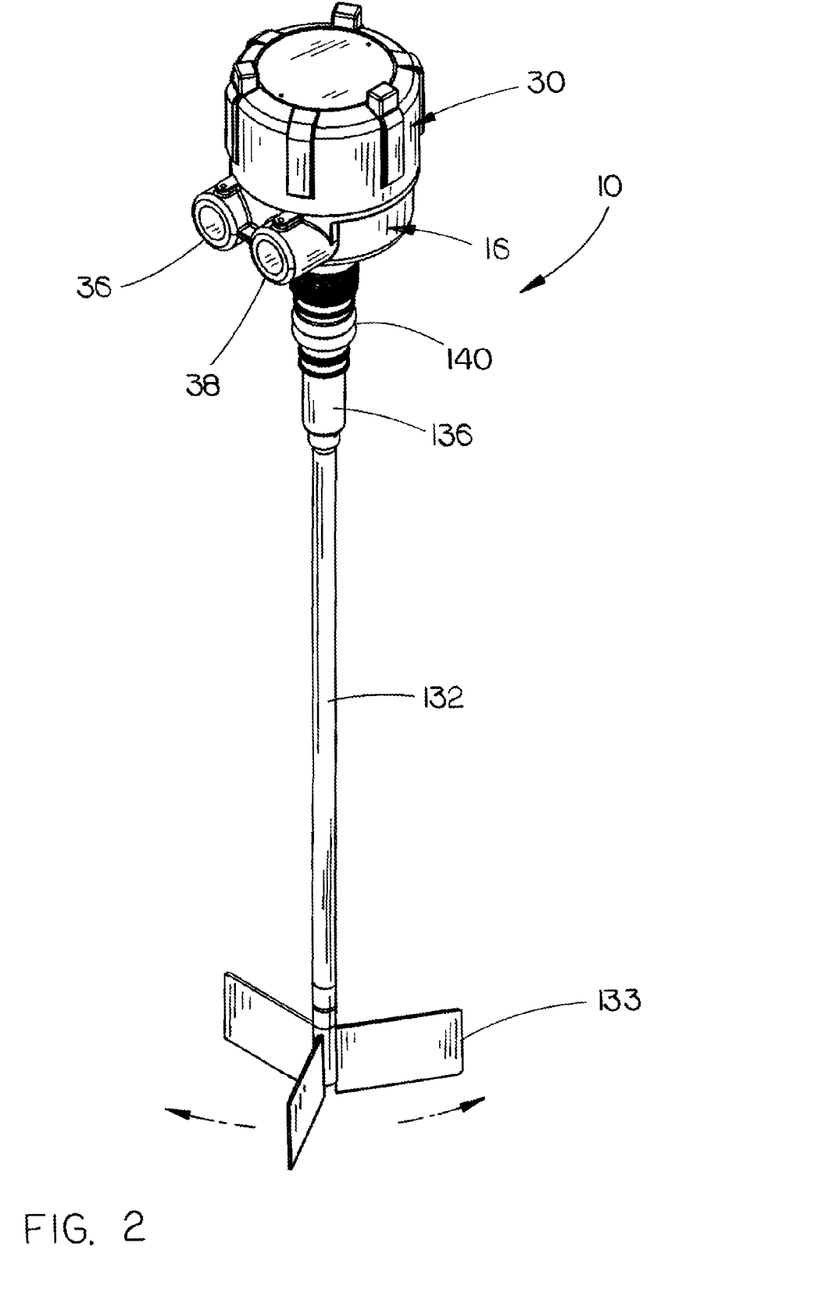
FIG. 2 is a perspective view of the level sensor of this invention.
Figure 3:
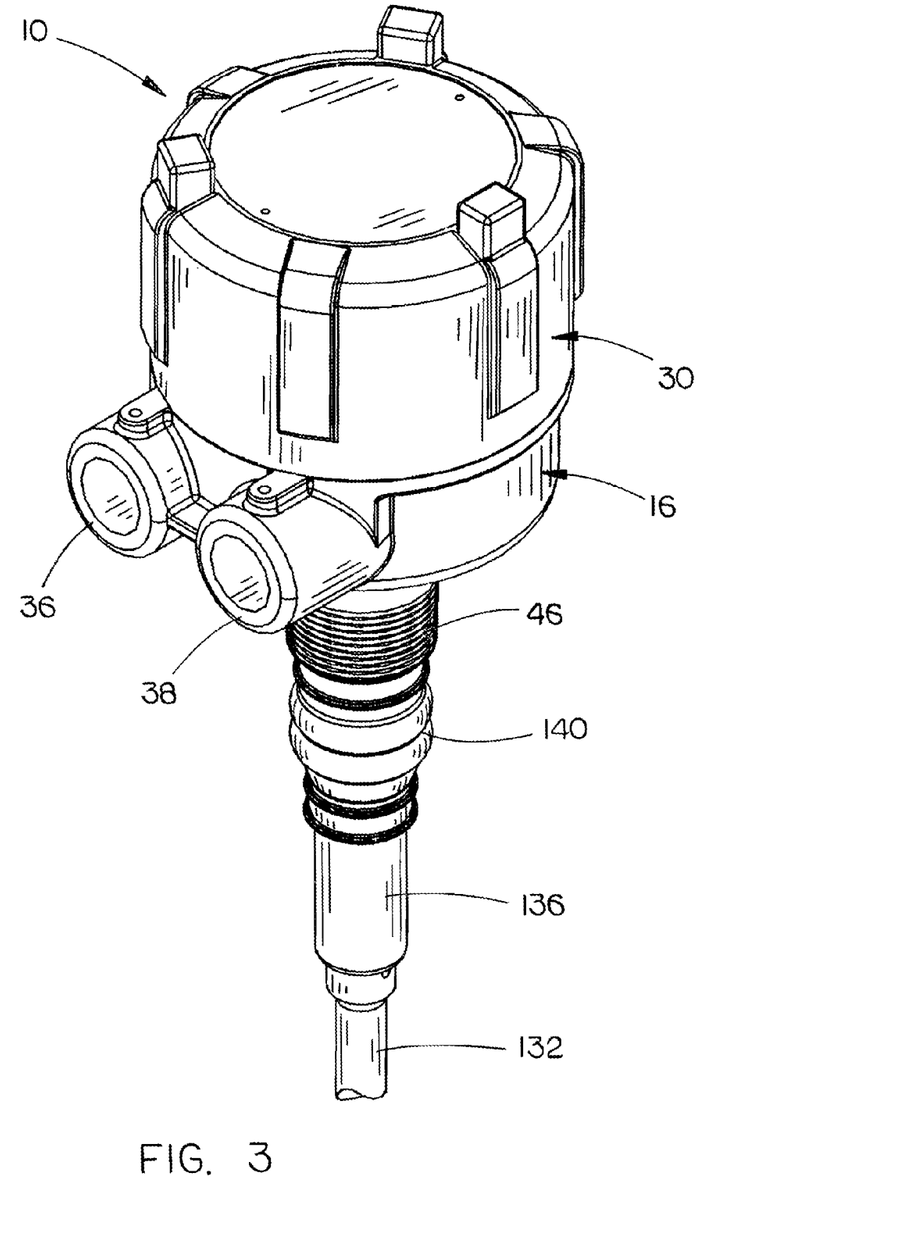
FIG. 3 is a partial perspective view of the level sensor of this invention.
Figure 4:
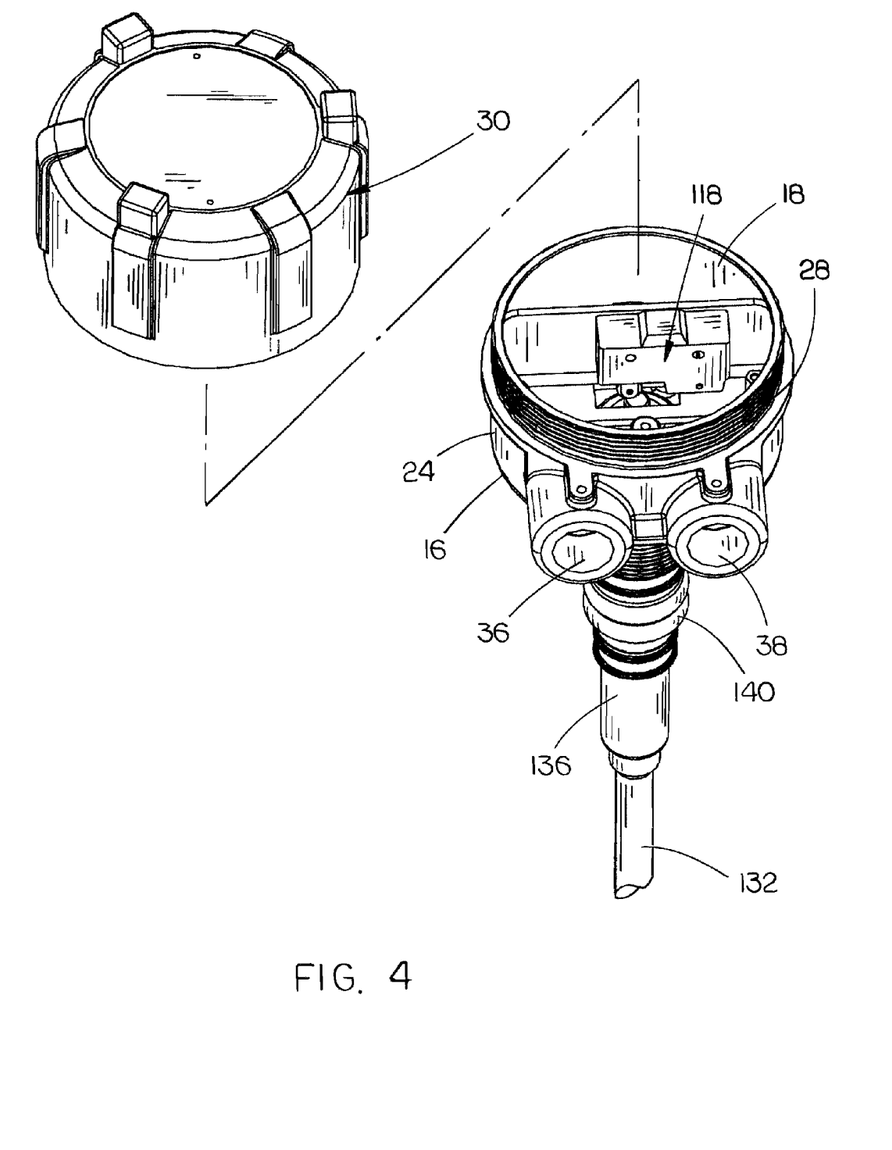
FIG. 4 is a partial exploded perspective view of the level sensor of this invention.
Figure 5:
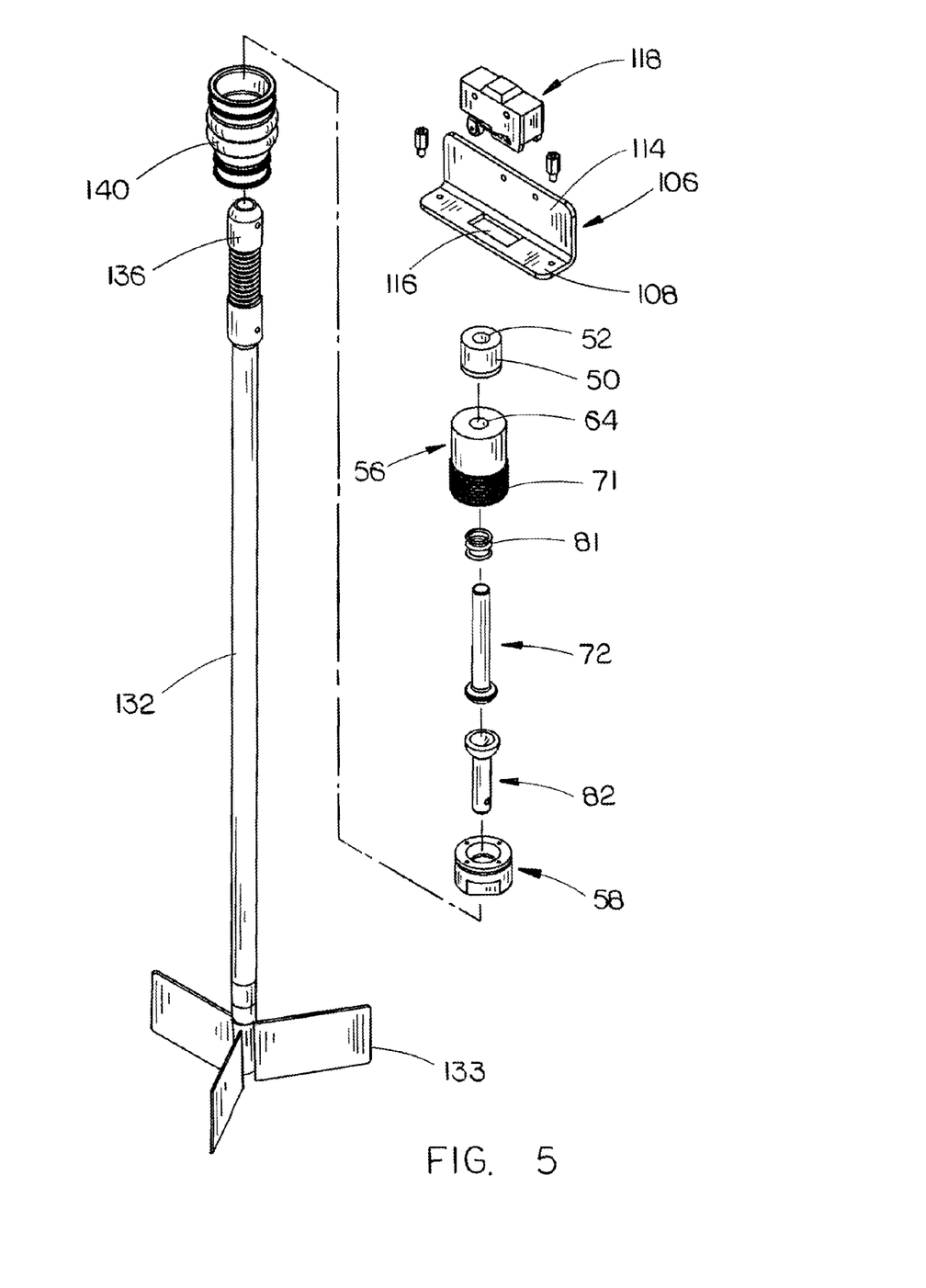
FIG. 5 is a partial exploded perspective view of the level sensor of this invention.
Figure 6:
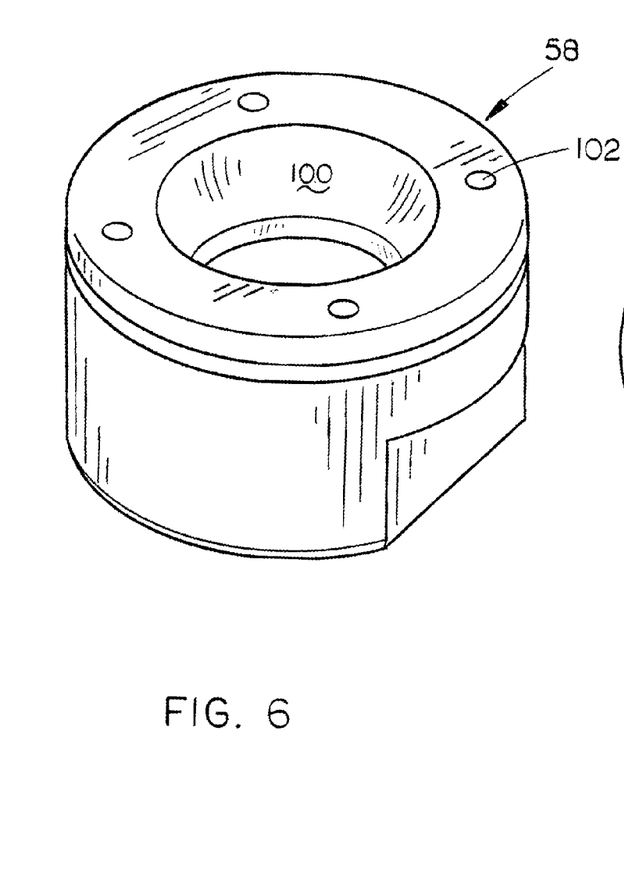
FIG. 6 is an upper perspective view of the lower housing member of the actuator assembly of the level sensor of this invention.
Figure 7:
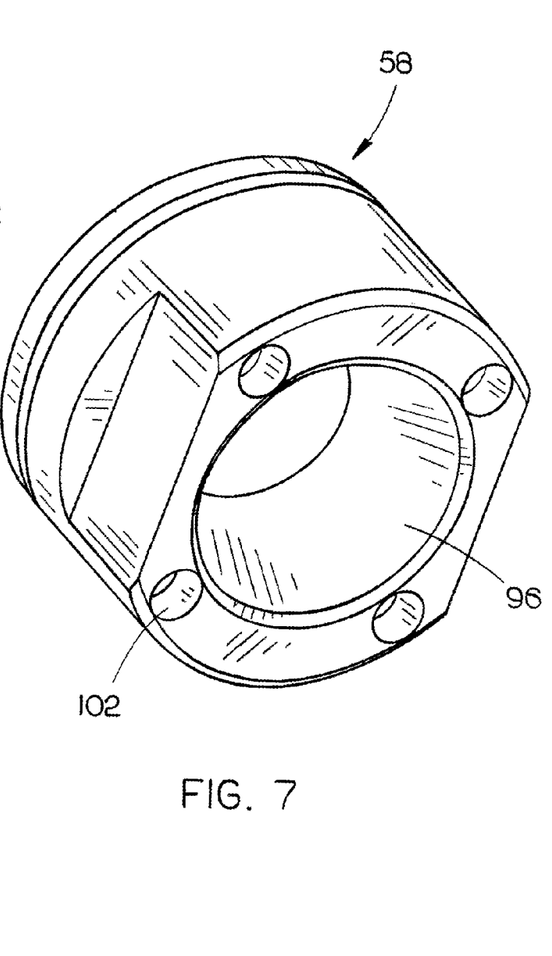
FIG. 7 is a lower perspective view of the lower housing member of the actuator assembly of the level sensor of this invention.
Figure 8:
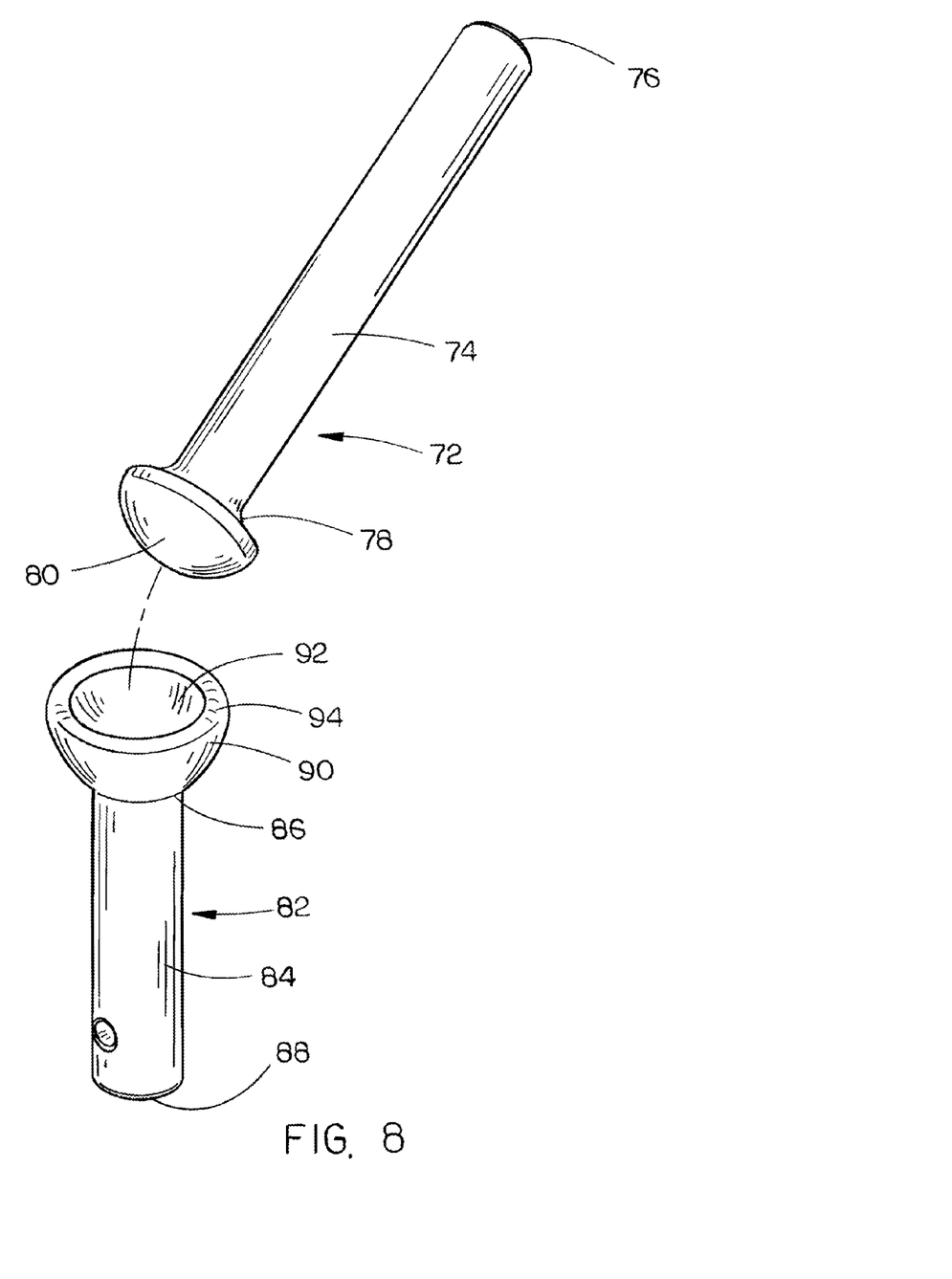
FIG. 8 is a perspective view of the upper and lower actuator elements of the level sensor of this invention.
Figure 9:
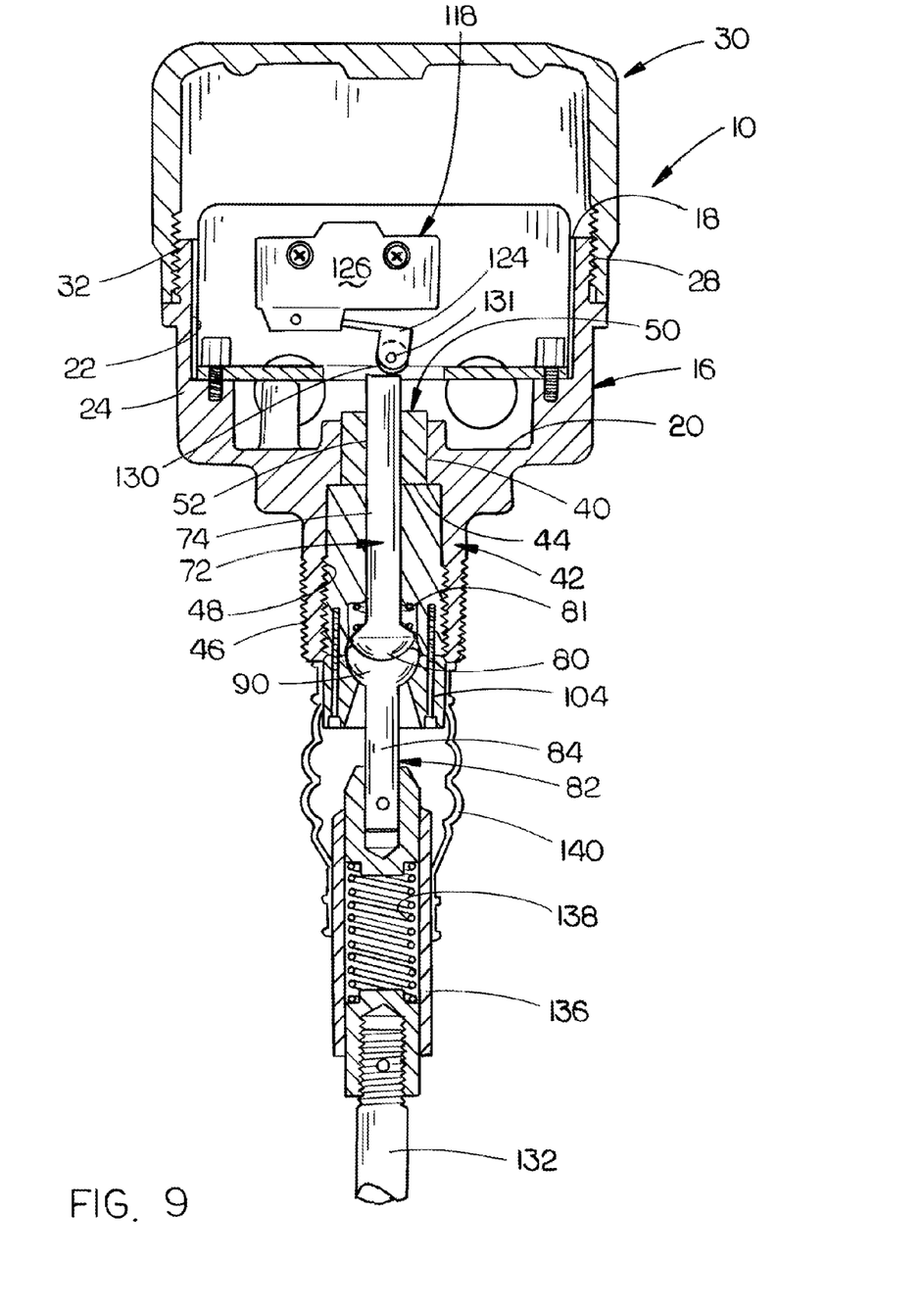
FIG. 9 is a partial sectional view of the level sensor of this invention.

The numeral 10 refers to the material level sensor of this invention which is designed to be used in a containment structure 12 such as an elevator, bin, granary, silo, etc. to sense the level of a particular or flowable material 14 therein such as cement, grain, coal, etc. Sensor 10 includes a vertically disposed cylindrical and cup-shaped lower housing 16, having an open upper end 18, a closed lower end 20, an inner surface 22, an outer surface 24, and an internal compartment 26. The lower housing 16 has external threads 28 formed in the outer surface 24 at the open upper end 18.

An inverted cup-shaped cover 30 has internal threads 32 formed in the inside surface thereof at the lower end thereof which are adapted to be threadably secured to the external threads 28 on lower housing 16. An O-ring 34 embraces the lower end of external threads 28.

A pair of tubular members or pipe stubs 36 and 38 extend laterally outwardly from internal compartment 26 of lower housing 16 for the passage of wires or cables extending therethrough. In some cases, only a single tubular member 36 will be required. The lower end 20 of lower housing 16 has a centrally positioned opening 40 formed therein. Lower housing 16 has a tubular member 42 extending downwardly from lower end 20 and which has an inside diameter which is greater than the diameter of opening 40 to define a shoulder 44 therebetween. Tubular member 42 has external threads 46 formed in the outer surface thereof at the lower end thereof and has internal threads 48 formed in the inner surface thereof. As seen, a bushing 50 is positioned in opening 40 and has a vertically disposed bore 52 extending therethrough.

Figure 11:
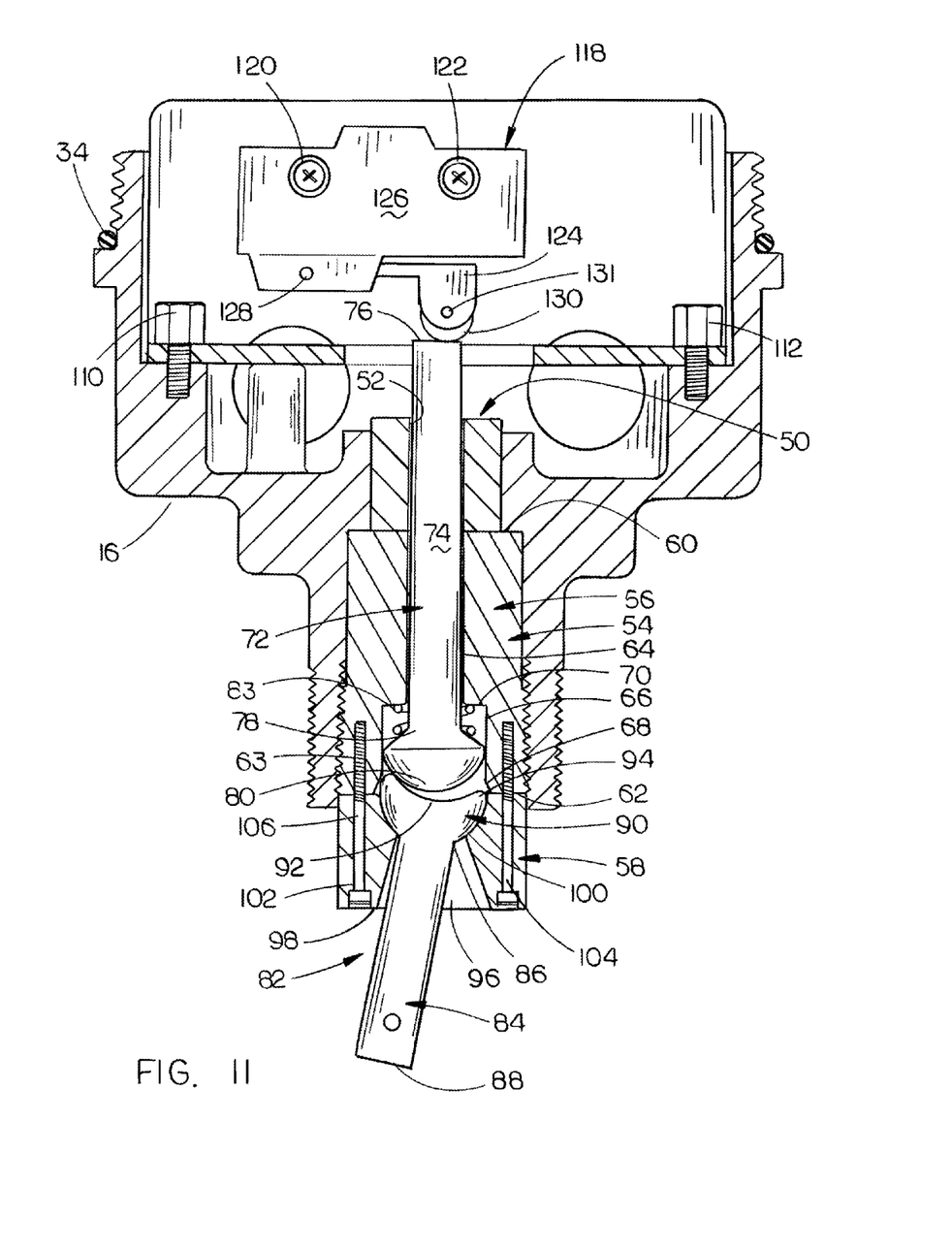
FIG. 11 is a partial sectional view similar to FIG. 10 but which illustrates the lower actuator element having been angularly moved thereby causing upward movement of the upper actuator element thereby closing the switch of the level sensor.

The numeral 54 refers to the actuator assembly of this invention which includes a cylindrical upper housing member 56 and a cylindrical lower housing member 58 which is secured to the upper housing member 56 as will be described hereinafter. Upper housing member 56 has an upper end 60 and a lower end 62. A plurality of spaced-apart internally threaded openings 63 extend upwardly into the lower end of housing member 56. An upper cylindrical bore 64 extends downwardly into housing member 56 from the upper end 60 thereof as seen in FIG. 11. A lower bore 66 extends upwardly into housing member 56 from the lower end 62 thereof. The lower end of bore 66 has a tapered portion 68. As seen, the upper end of bore 66 has a diameter which is greater than the diameter of bore 64 thereby forming a shoulder 70 therebetween. Housing member 56 has external threads 71 formed on its lower end.

Actuator assembly 54 also includes an upper actuator element 72 having a cylindrical shaft 74 with an upper end 76 and a lower end 78. Actuator element 72 has a downwardly presented semi-spherical ball 80 at its lower end. Prior to lower housing member 58 being secured to housing member 56, spring 81 is inserted into bore 66 of housing member 56 so that the upper end 83 of spring 81 engages shoulder 70. Actuator element 72 is then inserted into housing member 56 with shaft 74 extending upwardly into bore 64 with the lower end of spring 81 engaging ball 80.

Actuator assembly 54 also includes a lower actuator element 82 having a cylindrical shaft 84 with an upper end 86 and a lower end 88. Shaft 84 has a semi-spherical ball 90 formed therewith at the upper end 86 of shaft 84. The upper end of ball 90 has a ball receiving socket 92 formed therein. The periphery of socket 92 is designated with the reference numeral 94.

Lower housing member 58 has a tapered bore 96 extending upwardly thereinto from the lower end 98 of housing member 58. Lower housing member 58 has a semi-spherical ball receiving socket 100 formed therein at the upper end thereof. Lower housing member 58 has a plurality of spaced-apart counter-sunk openings 102 extending upwardly thereinto from the lower end 98 of lower housing member 58 adapted to receive bolts 104 thereinto.

Prior to lower housing member 58 being secured to upper housing member 56, shaft 84 of lower actuator element 82 is inserted downwardly through socket 100 and bore 96 so that semi-spherical ball 90 engages socket 100. Lower housing member 58, with lower actuator element 82 positioned therein, is secured to upper housing member 56 by the bolts 104. When lower housing member 58 is secured to upper housing member 56, spring 81 yieldably urges ball 80 of upper actuator element 72 into engagement with socket 92 of ball 90.

A switch support bracket 106 is positioned within compartment 26 of lower housing 16. Switch support bracket 106 includes a horizontally disposed base portion 108 which is secured to lower housing 16 by bolts 110 and 112. Switch support bracket 106 also includes a wall portion 114 which extends upwardly from base portion 108. Base portion 108 has a central slot or opening 116 formed therein.

A conventional, normally open electrical switch 118 is secured to wall portion 114 above base portion 108 by bolts 120 and 122. Switch 118 includes a lever arm 124 which is pivotally secured, about a horizontal axis, to the switch body 126 by pivot pin 128. A roller 130 is secured to the outer end of lever arm 124 by pivot pin 131 so that roller 130 extends downwardly into opening 116.

To summarize somewhat, the sensor 10 is assembled and functions as will now be described. The actuator assembly 54 is assembly by inserting the spring 81 and upper actuator element into upper housing member 56 prior to lower housing member 58 being secured to upper housing member 56. The lower actuator element 82 is then inserted into lower housing member 56, as previously described. The bolts 104 are then inserted into the counter-sunk openings 102 and threaded into openings 63 in upper housing member 56 to secured lower housing member 58 to upper housing member 56. When lower housing member 58 is secured to upper housing member 56, spring 81 urges ball 80 into engagement with the socket 92 of ball 90.

Figure 10:
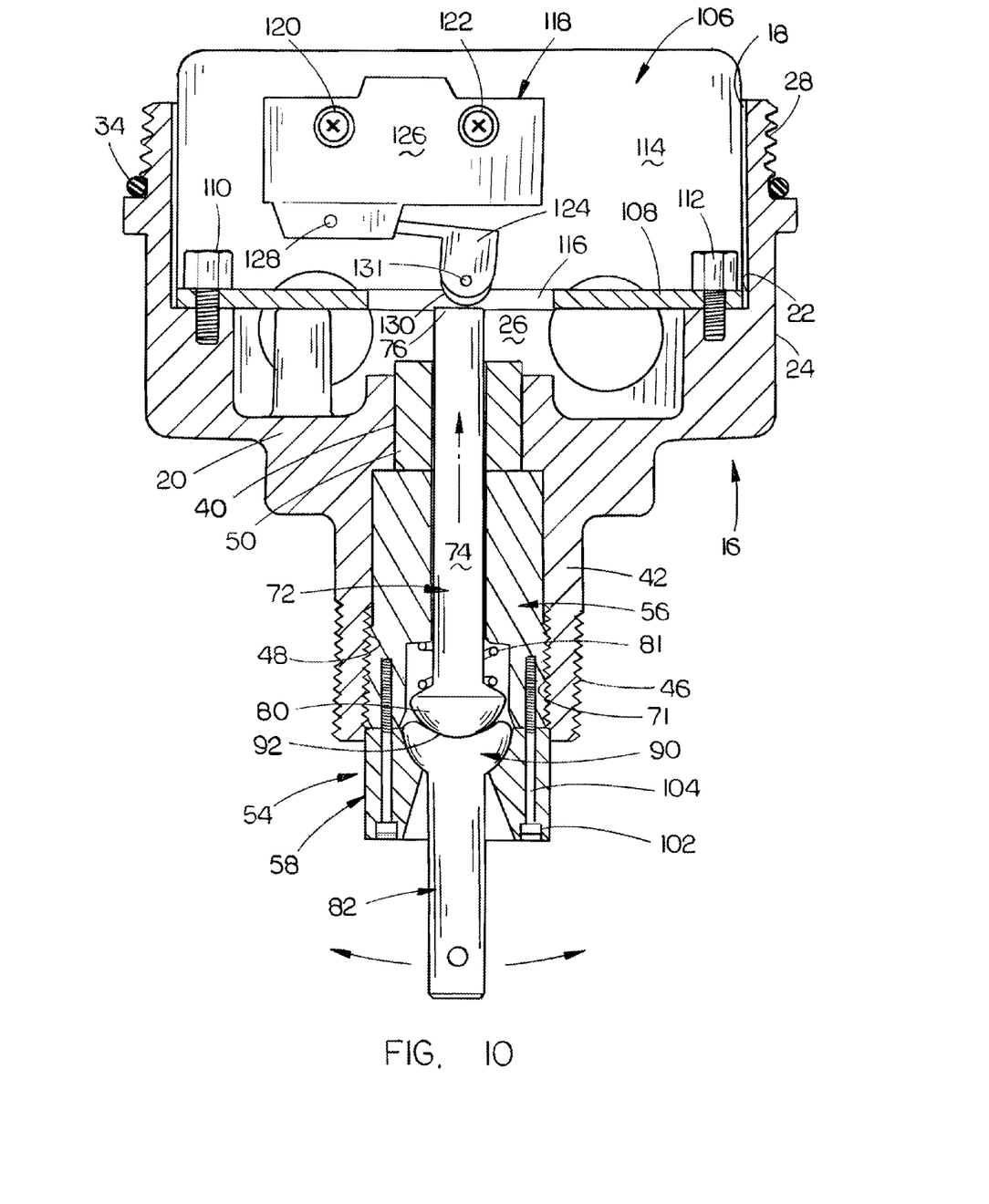
FIG. 10 is a partial sectional view of the level sensor of this invention.

Bushing 50 is then inserted upwardly into opening 40. Actuator assembly 54 is then threaded upwardly into tubular member 42 with threads 71 on upper housing member 56 engaging threads 48 on tubular member 42. When actuator assembly 54 is secured to tubular member 42, the upper end 76 of shaft 74 will be positioned, as seen in FIG. 10, so as to be closely positioned, if not engaging, the roller 130. At that time, switch 118 is in an open position. The sensor 10 is then positioned in the containment structure 12, as seen in FIG. 1, and secured thereto in a convenient manner usually with the threads 46.

If not already connected, an elongated rod 132, having a vane 133 on the lower end thereof, will be connected to the shaft 84 of lower actuator element 82 by a connector 136 which includes a spring 138 which yieldably maintains rod 132 in a vertically disposed attitude. Further, if not already installed, a flexible sleeve 140 will be positioned so as to extend between lower housing member 58 and the connector 136.

When the sensor 10 is positioned in the containment structure 12, as seen in FIG. 1, the sensor 10 does not come into play until the material 14 reaches the lower end of rod 132 at which time the vane 133 and the lower end of rod 132 will be moved laterally which causes lower actuator element 84 to laterally or angularly move. The angular movement of lower actuator element 84 causes the ball 90 to pivot with respect to ball 80 which causes upper actuator element 72 to move upwardly. The upward movement of shaft 74 causes the upper end 76 of shaft 74 to move the roller 130 upwardly which causes the lever arm 124 to pivotally move upwardly which causes the switch 118 to close. The switch 118 is electrically connected to an alarm or monitoring system (not shown) which will either deactivate the conveyor which is conveying material to the containment structure 12 or to alert personnel that the level of material in the containment structure has reached a certain level.

Thus it can be seen that the sensor of this invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. A flowable material level sensor for use in a material containment structure, comprising:

a vertically disposed, cylindrical cup-shaped lower housing having an open upper end, a closed lower end, an inner surface, an outer surface and an internal compartment;

said lower housing having external threads formed in said outer surface thereof at said upper end thereof;

a cover selectively threadably secured to said upper end of said lower housing;

said lower housing having at least one hollow first tubular member extending horizontally laterally outwardly from said internal compartment which is configured to have a cable or wire extending therethrough;

said lower end of said lower housing having a centrally located circular opening formed therein;

a hollow second tubular member having upper and lower ends;

said upper end of said second tubular member affixed to said lower end of said lower housing whereby the interior of said second tubular member is in communication with said circular opening in said lower end of said lower housing;

said second tubular member having internal threads formed therein at said lower end thereof;

a vertically disposed cylindrical actuator assembly having upper and lower ends;

said actuator assembly including an upper vertically disposed and cylindrical housing member having upper and lower ends;

said upper housing member of said actuator assembly having a lower bore extending upwardly thereinto from said lower end thereof;

said upper housing member of said actuator assembly having an upper bore extending downwardly thereinto which communicates with said lower bore thereof;

said upper bore of said upper housing having a diameter less than said lower bore of said housing so that a shoulder is formed at the juncture of said upper and lower bores of said upper housing member of said actuator assembly;

said upper housing member of said actuator assembly having external threads at said lower end thereof for threadable connection to said internal threads of said second tubular member;

said actuator assembly including a vertically disposed and cylindrical lower housing member having upper and lower ends;

said lower housing member of said actuator assembly being selectively removably secured to said lower end of said upper housing member of said actuator assembly;

said lower housing member of said actuator assembly having an upper bore, having upper and lower ends, extending downwardly thereinto;

said upper end of said bore of said lower housing member of said actuator assembly having the same diameter as said upper end of said lower bore of said upper housing member of said actuator assembly and being in communication therewith;

said lower housing member of said actuator assembly having a lower bore, having upper and lower ends, extending upwardly thereinto;

said upper bore of said lower housing member of said actuator assembly being configured to provide an arcuate ball receiving socket;

said actuator assembly including a lower actuator element;

said lower actuator element including an elongated, cylindrical shaft having upper and lower ends, and a generally semi-spherical ball member having a lower end secured to said upper end of said cylindrical shaft thereof and an upper end which has a semi-spherical socket formed therein;

said ball member of said lower actuator element being movably positioned in said arcuate ball receiving socket in said upper bore of said lower housing member of said actuator assembly with said cylindrical shaft of said lower actuator element extending downwardly through said lower bore of said lower housing member with said lower end of said shaft of said lower actuator element being disposed below said lower end of said actuator assembly;

said actuator assembly also including an upper actuator element;

said upper actuator element including an elongated, cylindrical shaft having upper and lower ends, and a generally semi-spherical ball member having an upper end secured to said lower end of said shaft thereof, with said shaft thereof extending upwardly through said lower and upper bores of said upper housing member of said actuator assembly and with said ball member thereof being movably received by said semi-spherical socket in the upper end of said ball member of said lower actuator element;

a spring embracing said shaft of said upper actuator element between said ball member thereof and said shoulder between said upper and lower bores of said upper housing member to yieldably downwardly urge said upper actuator member into engagement with said ball member of said lower actuator element whereby angular movement of said lower actuator element causes linear movement of said upper actuator element;

an elongated level sensing rod, having upper and lower ends;

said upper end of said level sensing rod being fixed to said lower end of said shaft of said lower actuator element whereby movement of said level sensing rod by flowable material being deposited in a containment structure will cause angular movement of said lower actuator element thereby causing upwardly linear movement of said upper actuator element;

a normally open switch positioned in said internal compartment of said lower housing member above said upper end of said shaft of said upper actuator element whereby upward movement of said shaft of said upper actuator element will close said switch.

2. The flowable material level sensor of claim 1 wherein a cylindrical housing, having upper and lower ends, is positioned in said circular opening in said lower end of said lower housing and wherein said cylindrical bushing has a vertically disposed bore extending therethrough and wherein said shaft of said upper actuator element extends upwardly through said bore of said cylindrical bushing.

3. The flowable material level sensor of claim 1 wherein a connector member, having an upper end and a lower end, has its said upper end secured to said lower end of said shaft of said lower actuator member and has its said lower end secured to said upper end of said level sensing rod.

4. The flowable material level sensor of claim 3 further including a vertically disposed flexible shroud, having upper and lower ends, has its said upper end embracing said lower end of said lower housing member and has its said lower end embracing said connector member.

5. A flowable material level sensor for use in a material containment structure, comprising:

a vertically disposed, lower housing having an open upper end, a closed lower end, an inner surface, an outer surface and an internal compartment;

said lower housing having external threads formed in said outer surface thereof at said upper end thereof;

a cover selectively threadably secured to said upper end of said lower housing;

said lower housing having at least one hollow first tubular member extending horizontally laterally outwardly from said internal compartment which is configured to have a cable or wire extending therethrough;

said lower end of said lower housing having a centrally located circular opening formed therein;

a hollow second tubular member having upper and lower ends;

said upper end of said second tubular member affixed to said lower end of said lower housing whereby the interior of said second tubular member is in communication with said circular opening in said lower end of said lower housing;

said second tubular member having internal threads formed therein at said lower end thereof;

a vertically disposed cylindrical actuator assembly having upper and lower ends;

said actuator assembly including an upper vertically disposed and cylindrical housing member having upper and lower ends;

said upper housing member of said actuator assembly having a lower bore extending upwardly thereinto from said lower end thereof;

said upper housing member of said actuator assembly having an upper bore extending downwardly thereinto which communicates with said lower bore thereof;

said upper bore of said upper housing having a diameter less than said lower bore of said housing so that a shoulder is formed at the juncture of said upper and lower bores of said upper housing member of said actuator assembly;

said upper housing member of said actuator assembly having external threads at said lower end thereof for threadable connection to said internal threads of said second tubular member;

said actuator assembly including a vertically disposed and cylindrical lower housing member having upper and lower ends;

said lower housing member of said actuator assembly being selectively removably secured to said lower end of said upper housing member of said actuator assembly;

said lower housing member of said actuator assembly having an upper bore, having upper and lower ends, extending downwardly thereinto;

said upper end of said bore of said lower housing member of said actuator assembly having the same diameter as said upper end of said lower bore of said upper housing member of said actuator assembly and being in communication therewith;

said lower housing member of said actuator assembly having a lower bore, having upper and lower ends, extending upwardly thereinto;

said upper bore of said lower housing member of said actuator assembly being configured to provide an arcuate ball receiving socket;

said actuator assembly including a lower actuator element;

said lower actuator element including an elongated, cylindrical shaft having upper and lower ends, and a generally semi-spherical ball member having a lower end secured to said upper end of said cylindrical shaft thereof and an upper end which has a semi-spherical socket formed therein;

said ball member of said lower actuator element being movably positioned in said arcuate ball receiving socket in said upper bore of said lower housing member of said actuator assembly with said cylindrical shaft of said lower actuator element extending downwardly through said lower bore of said lower housing member with said lower end of said shaft of said lower actuator element being disposed below said lower end of said actuator assembly;

said actuator assembly also including an upper actuator element;

said upper actuator element including an elongated, cylindrical shaft having upper and lower ends, and a generally semi-spherical ball member having an upper end secured to said lower end of said shaft thereof, with said shaft thereof extending upwardly through said lower and upper bores of said upper housing member of said actuator assembly and with said ball member thereof being movably received by said semi-spherical socket in the upper end of said ball member of said lower actuator element;

a spring embracing said shaft of said upper actuator element between said ball member thereof and said shoulder between said upper and lower bores of said upper housing member to yieldably downwardly urge said upper actuator member into engagement with said ball member of said lower actuator element whereby angular movement of said lower actuator element causes linear movement of said upper actuator element;

an elongated level sensing rod, having upper and lower ends;

said upper end of said level sensing rod being fixed to said lower end of said shaft of said lower actuator element whereby movement of said level sensing rod by flowable material being deposited in a containment structure will cause angular movement of said lower actuator element thereby causing upwardly linear movement of said upper actuator element;

a normally open switch positioned in said internal compartment of said lower housing member above said upper end of said shaft of said upper actuator element whereby upward movement of said shaft of said upper actuator element will close said switch;

and one or more wires or cables electrically connected to said switch which extend outwardly from said switch through said first tubular member to a monitoring location remote from the containment structure.

6. The flowable material level sensor of claim 5 wherein said lower bore of said lower housing member is tapered so that the lower end of said lower bore of said lower housing member has a greater diameter than the upper end of said lower bore of said lower housing member.

7. The flowable material level sensor of claim 5 wherein said lower housing and said second tubular member are integrally formed.

8. The flowable material level sensor of claim 5 wherein said switch includes a pivotal switch arm having a roller mounted thereon which is normally partially received in said circular openings in said lower end of said lower housing.

9. A flowable material level sensor for use in a material containment structure, comprising:

a vertically disposed, lower housing having an open upper end, a closed lower end, an inner surface, an outer surface and an internal compartment;

a cover selectively secured to said upper end of said lower housing;

said lower housing having at least one hollow first tubular member extending horizontally laterally outwardly from said internal compartment which is configured to have a cable or wire extending therethrough;

said lower end of said lower housing having a centrally located circular opening formed therein;

a hollow second tubular member having upper and lower ends;

said upper end of said second tubular member affixed to said lower end of said lower housing whereby the interior of said second tubular member is in communication with said circular opening in said lower end of said lower housing;

a vertically disposed cylindrical actuator assembly having upper and lower ends;

said actuator assembly including an upper vertically disposed and cylindrical housing member having upper and lower ends;

said upper housing member of said actuator assembly having a lower bore extending upwardly thereinto from said lower end thereof;

said upper housing member of said actuator assembly having an upper bore extending downwardly thereinto which communicates with said lower bore thereof;

said upper bore of said upper housing having a diameter less than said lower bore of said housing so that a shoulder is formed at the juncture of said upper and lower bores of said upper housing member of said actuator assembly;

said upper housing member of said actuator assembly being secured to said second tubular member;

said actuator assembly including a vertically disposed and cylindrical lower housing member having upper and lower ends;

said lower housing member of said actuator assembly being selectively removably secured to said lower end of said upper housing member of said actuator assembly;

said lower housing member of said actuator assembly having an upper bore, having upper and lower ends, extending downwardly thereinto;

said upper end of said upper bore of said lower housing member of said actuator assembly being in communication with said lower bore of said upper housing member;

said lower housing member of said actuator assembly having a lower bore, having upper and lower ends, extending upwardly thereinto;

said upper end of said upper bore of said lower housing member of said actuator assembly being configured to provide an arcuate ball receiving socket;

said actuator assembly including a lower actuator element;

said lower actuator element including an elongated, cylindrical shaft having upper and lower ends, and a generally semi-spherical ball member having a lower end secured to said upper end of said cylindrical shaft thereof and an upper end which has a semi-spherical socket formed therein;

said ball member of said lower actuator element being movably positioned in said arcuate ball receiving socket in said upper bore of said lower housing member of said actuator assembly with said cylindrical shaft of said lower actuator element extending downwardly through said lower bore of said lower housing member with said lower end of said shaft of said lower actuator element being disposed below said lower end of said actuator assembly;

said actuator assembly also including an upper actuator element;

said upper actuator element including an elongated, cylindrical shaft having upper and lower ends, and a generally semi-spherical ball member having an upper end secured to said lower end of said shaft thereof, with said shaft thereof extending upwardly through said lower and upper bores of said upper housing member of said actuator assembly and with said ball member thereof being movably received by said semi-spherical socket in the upper end of said ball member of said lower actuator element;

a spring embracing said shaft of said upper actuator element between said ball member thereof and said shoulder between said upper and lower bores of said upper housing member to yieldably downwardly urge said upper actuator member into engagement with said ball member of said lower actuator element whereby angular movement of said lower actuator element causes linear movement of said upper actuator element;

an elongated level sensing rod, having upper and lower ends;

said upper end of said level sensing rod being fixed to said lower end of said shaft of said lower actuator element whereby movement of said level sensing rod by flowable material being deposited in a containment structure will cause angular movement of said lower actuator element thereby causing upwardly linear movement of said upper actuator element;

a switch positioned in said internal compartment of said lower housing member above said upper end of said shaft of said upper actuator element whereby upward movement of said shaft of said upper actuator element will actuate said switch;

and one or more wires or cables electrically connected to said switch which extend outwardly from said switch through said first tubular member to a monitoring location remote from the containment structure.

10. The flowable material level sensor of claim 9 wherein said lower bore of said lower housing member is tapered so that the lower end of said lower bore of said lower housing member has a greater diameter than the upper end of said lower bore of said lower housing member.

11. The flowable material level sensor of claim 9 wherein said lower housing and said second tubular member are integrally formed.

12. The flowable material level sensor of claim 9 wherein said switch includes a pivotal switch arm having a roller mounted thereon which is normally partially received in said circular openings in said lower end of said lower housing.

* * * * *